(12) United States Patent
Gonzalez-Mohino

(10) Patent No.: US 10,426,094 B2
(45) Date of Patent: Oct. 1, 2019

(54) HARVESTER RECIPROCATING DRIVE BALANCING SYSTEM

(71) Applicant: Deere and Company, Moline, IL (US)

(72) Inventor: Pedro Gonzalez-Mohino, Madrid (ES)

(73) Assignee: Deere & Company, Moline, IL (US)

( * ) Notice: Subject to any disclaimer, the term of this patent is extended or adjusted under 35 U.S.C. 154(b) by 407 days.

(21) Appl. No.: 15/294,553

(22) Filed: Oct. 14, 2016

(65) Prior Publication Data
US 2018/0103590 A1  Apr. 19, 2018

(51) Int. Cl.
*A01F 12/32* (2006.01)
*A01F 12/38* (2006.01)
*A01F 12/56* (2006.01)
*A01F 12/44* (2006.01)

(52) U.S. Cl.
CPC ............ *A01F 12/56* (2013.01); *A01F 12/446* (2013.01)

(58) Field of Classification Search
CPC ...... A01D 41/12; A01D 69/00; A01D 69/002; A01D 41/127; A01F 12/446; A01F 12/448; A01F 12/60; A01F 12/444; A01F 12/46; A01F 12/56; A01F 12/38; A01F 75/282
USPC .............................. 460/101; 209/26, 318, 319
See application file for complete search history.

(56) References Cited

U.S. PATENT DOCUMENTS

| 4,198,802 | A | 4/1980 | Hengen et al. |
| 4,400,930 | A * | 8/1983 | Huhman ................ A01F 12/56 |
| | | | 474/19 |
| 6,412,260 | B1 | 7/2002 | Lukac |
| 7,805,919 | B2 | 10/2010 | Priepke |
| 9,714,695 | B2 * | 7/2017 | Barendrecht ............ F16H 9/18 |
| 9,814,179 | B2 * | 11/2017 | Duquesne .............. A01F 12/38 |
| 2008/0004092 | A1 | 1/2008 | Frederick |
| 2014/0298766 | A1 | 10/2014 | Furmaniak |

FOREIGN PATENT DOCUMENTS

| DE | 102009026870 | 12/2010 |
| EP | 2936967 | 10/2015 |

OTHER PUBLICATIONS

European search report for 17196342.4 dated Mar. 19, 2018.

* cited by examiner

*Primary Examiner* — Robert E Pezzuto
(74) *Attorney, Agent, or Firm* — Rathe Lindenbaum LLP

(57) ABSTRACT

A harvester reciprocating drive balancing system may include a crop material separating member movably supported for reciprocal movement and a drive operably coupled to the crop material separating member to reciprocate the crop material separating member. The drive may include a drive crank operably coupled to the crop material separating member, a shaft operably coupled to the drive crank, a belt drive, a driven pulley, a belt wrapped about the belt drive and the driven pulley and a gear reduction mechanism operably coupled between the driven pulley and the shaft.

18 Claims, 4 Drawing Sheets

HARVESTER RECIPROCATING DRIVE BALANCING SYSTEM

BACKGROUND

Harvesters, such as combines, may use a variety of reciprocating crop material separating members to separate grain from remaining portions of the crop material. For example, many harvesters employ reciprocating chaffers or sieves through which grain falls while the remaining material other than grain is blown rearwardly and discharged. Many harvesters employ straw walkers that are reciprocated to separate straw or stalks from grain or grain carrying portions of the crop material.

DETAILED DESCRIPTION OF EXAMPLES

Figure 1:
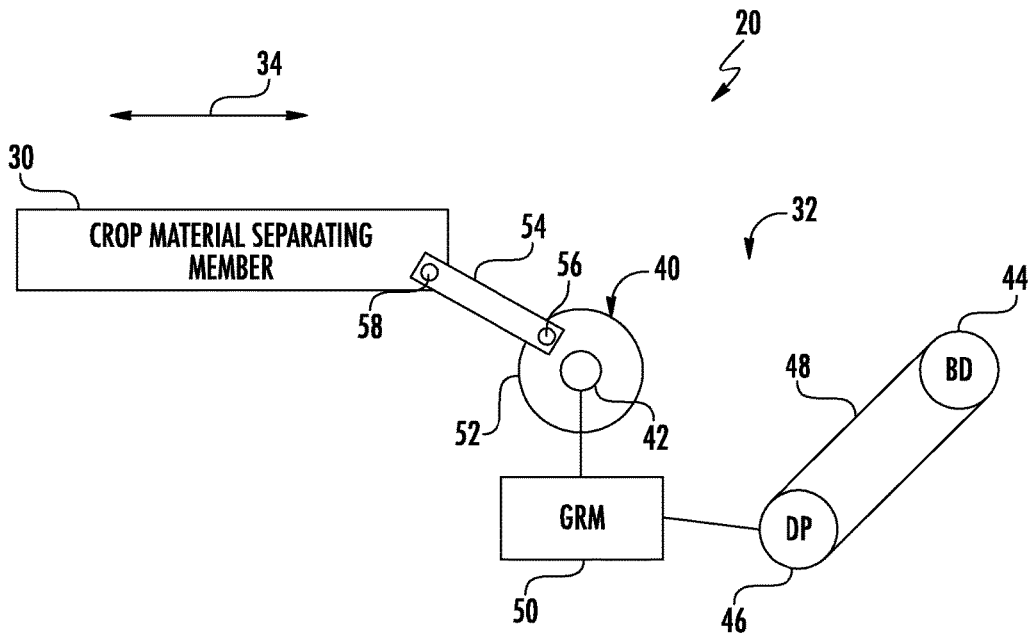
FIG. 1 is a schematic diagram of an example harvester reciprocating drive balancing system.

Many harvesters comprise crop material separating members that are reciprocated to facilitate separation of grain from the remaining material other than grain. Many harvesters utilize a belt drive system to reciprocatively drive the crop material separating members. The reciprocation of the crop material separating members may result in speed and torque variations in the drive system. For example, at the end of an eccentric stroke of a crank arm, the system may experience accelerations. Such speed and torque variations may cause rapid degradation of the belt or belt of the belt drive system.

Disclosed herein are example harvester reciprocating drive balancing systems and an example method that reduce such speed variations to potentially prolong the life of the belts of the belt drive system. The example harvester reciprocating drive balancing systems and the example method utilize a gear reduction mechanism in combination with a flywheel to store energy or provide inertia that dampens any speed variations that might otherwise occur during reciprocation of the harvester crop separating members. The gear reduction mechanism facilitates driving of a driven pulley at a much greater speed than at which the shaft that reciprocates the crop separating members is driven. The gear reduction mechanism provides increased inertia or energy storage without corresponding increases in the mass of the flywheel. As a result, gear reduction mechanism provides enhanced dampening of speed variations while at the same time facilitating a reduction in the size and weight of the flywheel.

Disclosed herein is an example harvester reciprocating drive balancing system. The harvester reciprocating drive balancing system comprises a crop material separating member movably supported for reciprocal movement and a drive operably coupled to the crop material separating member to reciprocate the crop material separating member. The drive may include a drive crank operably coupled to the crop material separating member, a shaft operably coupled to the drive crank, a belt drive, a driven pulley, a belt wrapped about the belt drive and the driven pulley and a gear reduction mechanism operably coupled between the driven pulley and the shaft.

Disclosed herein is an example harvester cleaning shoe. The harvester cleaning shoe comprises a sieve movably supported for reciprocal movement and a drive operably coupled to the sieve to reciprocate the sieve. The drive comprises a drive crank operably coupled to the crop material separating member, a shaft operably coupled to the drive crank, a belt drive, a driven pulley serving as a flywheel, a belt wrapped about the belt drive and the driven pulley and a planetary gear mechanism. The planetary gear mechanism comprises a ring gear coupled to the driven pulley to rotate with the driven pulley, a sun gear coupled to the shaft to rotate with the shaft and a planetary gear inner mashed between the ring gear and the sun gear.

Disclosed herein is an example method for separating portions of crop material. The example method comprises rotatably driving a driven pulley, serving as a flywheel, at a first speed, transmitting torque from the driven pulley to a shaft across a gear reduction mechanism to rotate the shaft at a second speed less than the first speed and transmitting torque from the shaft to a harvester crop material separating member to reciprocate the harvester crop material separating member.

FIG. 1 schematically illustrates an example harvester reciprocating drive balancing system 20. System 20 reduces such speed variations to potentially prolong the life of the belts of the belt drive system. System 20 utilizes a gear reduction mechanism in combination with a flywheel to store energy or provide inertia that dampens any speed variations that might otherwise occur during reciprocation of the harvester crop separating members. The gear reduction mechanism facilitates driving of a driven pulley at a much greater speed than at which the shaft that reciprocates the crop separating members is driven. The gear reduction mechanism provides increased inertia or energy storage without corresponding increases in the mass of the flywheel. As a result, gear reduction mechanism provides enhanced dampening of speed variations while at the same time facilitating a reduction in the size and weight of the flywheel. System 20 comprises crop material separating member 30, and drive 32.

Crop material separating member 30 comprises a member that is configured to separate different portions of crop material as member 30 is reciprocated, move back and forth, by drive 32. For purposes of this disclosure, the phrase "configured to" denotes an actual state of configuration that fundamentally ties the stated function/use to the physical characteristics of the feature proceeding the phrase "configured to".

Separating member 30 is movably supported for reciprocal movement in the direction indicated by arrows 34. For example, in one implementation, separating member 30 may be movably supported by hangers or other members that allow crop material separating member 30 to be rocked back and forth. In another implementation, separating member 30 may be movie supported in tracks that guide reciprocating movement of member 30. In one implementation, crop material separating member 30 comprises a cleaning member of a harvester cleaning shoe such as a sieve or chaffer, wherein grain falls through openings in the sieve or chaffer and straw are chaff is blown or otherwise directed away for discharge. In one implementation, crop material separating member 30 comprises a cleaning member of a harvester straw walker, wherein the individual walkers reciprocated back and forth with the straw being carried rearwardly for discharge and with the grain (and possibly some chaff) falling through and between the individual walkers.

Drive 32 reciprocates member 30 in the directions indicated by arrows 34. Drive 30 comprises drive crank 40, input shaft 42, belt drive 44, driven pulley 46, belt 48 and gear reduction mechanism 50. Drive crank 40 converts the torque a rotational motion of input shaft 42 to translational reciprocating motion. In the example illustrated, drive crank 40 comprises a crank wheel or disc 52 and a crank arm 54. Disc 52 is rotatably driven by input shaft 42 directly or indirectly via intermediate gears or an intermediate transmission. Crank arm 54 is eccentrically pivotally connected to disc 52 at a first pivot 56 and is pivotally connected or coupled to crop material separating member 30 at a second pivot 58. As a result, rotation of disc 52 results in linear translational reciprocating motion of member 30.

In other implementations, input shaft 42 may be operably coupled to crop separating member 30 by other drive crank configurations or by other mechanisms that produce reciprocating motion. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Belt drive 44 drives belt 48. The drive 44 comprises a drive pulley operably coupled to an engine or motor that supplies torque, through a transmission, to rotate belt drive 44. Belt 48 comprises an endless belt wrapped about belt drive 44 and driven pulley 46. In the example illustrated, belt drive 44 drives driven pulley 46 at a faster rate or greater number of revolutions per minute as the rate a revolutions per minute that shaft 42 is driven to reciprocate member 30.

Driven pulley 46 serves as a flywheel for system 20. Driven pulley 46 may have a mass which provides an inertia to store and release kinetic energy resulting from speed variations in system 20. For example, at the end of an eccentric stroke of crank arm 54, the system may experience accelerations. In some implementations, driven pulley 46 may comprise rings or discs of weight mounted to the remainder of pulley 46 to increase the inertia of pulley 46. In some implementations, pulley 46 may have a sufficient mass without rings or discs mounted thereto.

Gear reduction mechanism 50 is operably coupled between driven pulley 46 and input shaft 42. Gear reduction mechanism 50, sometimes also referred to as a speed reduction mechanism, converts a first speed, first torque input from driven pulley 46 to a second lower speed higher and second higher torque output to shaft 42. Gear reduction mechanism 50 facilitates a multiplication of energy storage by drive 32, a multiplication of the rotational inertia provided by drive 42, without a corresponding increase in the mass of the driven pulley 46 serving as a flywheel. As a result, the fly wheel provided by driven pulley 46 may be lighter in weight and maybe more compact. At the same time, the greater inertia provided by drive 32, resulting from gear reduction mechanism 50, facilitates greater energy storage by drive 32. The greater energy storage reduces or eliminates speed variations otherwise experienced by belt 48 during the reciprocating driving of member 30. The greater inertia of drive 32 may be better able to absorb excess energy as shaft 42 is accelerating and maybe a better able to release excess energy as shaft 42 as shaft 42 is decelerating. As a result, degradation of belt 48 may be reduced.

In one implementation, gear reduction mechanism 50 may comprise a planetary gear box. In such an implementation, the planetary gear box may further reduce the size increase the compactness of drive 32 and of system 20. In other implementations, gear reduction mechanism 50 may comprise other gear speed reducing transmissions.

Figure 2:
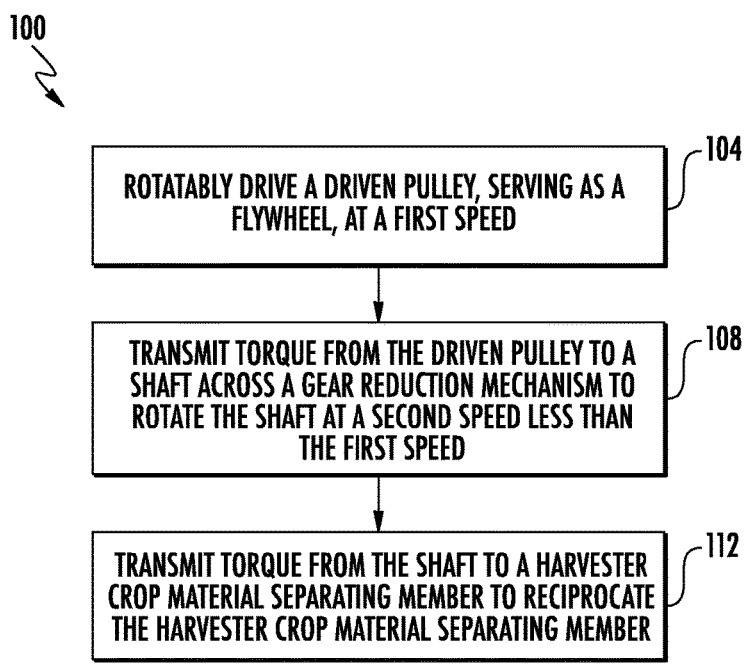
FIG. 2 is a flow diagram of an example method for separating constituents of crop material.

FIG. 2 is a flow diagram of an example method 100 for separating crop material in a harvester. Method 100 reciprocates a crop material separating member while storing and releasing excess energy resulting from such reciprocation to reduce speed variations experienced by the drive and its belt or belts, reducing wear and degradation the belt or belts. Although method 100 is described as being carried out with system 20, it should be appreciated that method 100 may be carried out with any of the harvester reciprocating drive balancing systems described hereafter or with any simile configured reciprocating drive balancing system in a harvester or other apparatus.

As shown by block 104, belt drive 44 rotatably drives a driven pulley 46. Driven pulley 46 serves as a flywheel. The driven pulley 46 is driven at a first speed or number of revolutions per minute.

As indicated by block 108, drive 32 further transmits torque from driven pulley 46 to shaft 42 across a gear reduction mechanism 50 to rotate the shaft 42 at a second speed less than the first speed. As indicated by block 112, torque from shaft 42 is transmitted to harvester crop material separating member 30, by crank 42 reciprocate harvester crop material separating member 30.

Method 100 facilitates a multiplication of energy storage by drive 32, a multiplication of the rotational inertia provided by drive 42, without a corresponding increase in the mass of the driven pulley 46 serving as a flywheel. As a result, the fly wheel provided by driven pulley 46 may be lighter in weight and maybe more compact. At the same time, the greater inertia provided by drive 32, resulting from gear reduction mechanism 50, facilitates greater energy storage by drive 32. The greater energy storage reduces or eliminates speed variations otherwise experienced by belt 48 during the reciprocating driving of member 30. The greater inertia of drive 32 may be better able to absorb excess energy as shaft 42 is accelerating and may be better able to release excess energy as shaft 42 as shaft 42 is decelerating. As a result, degradation of belt 48 may be reduced.

Figure 3:
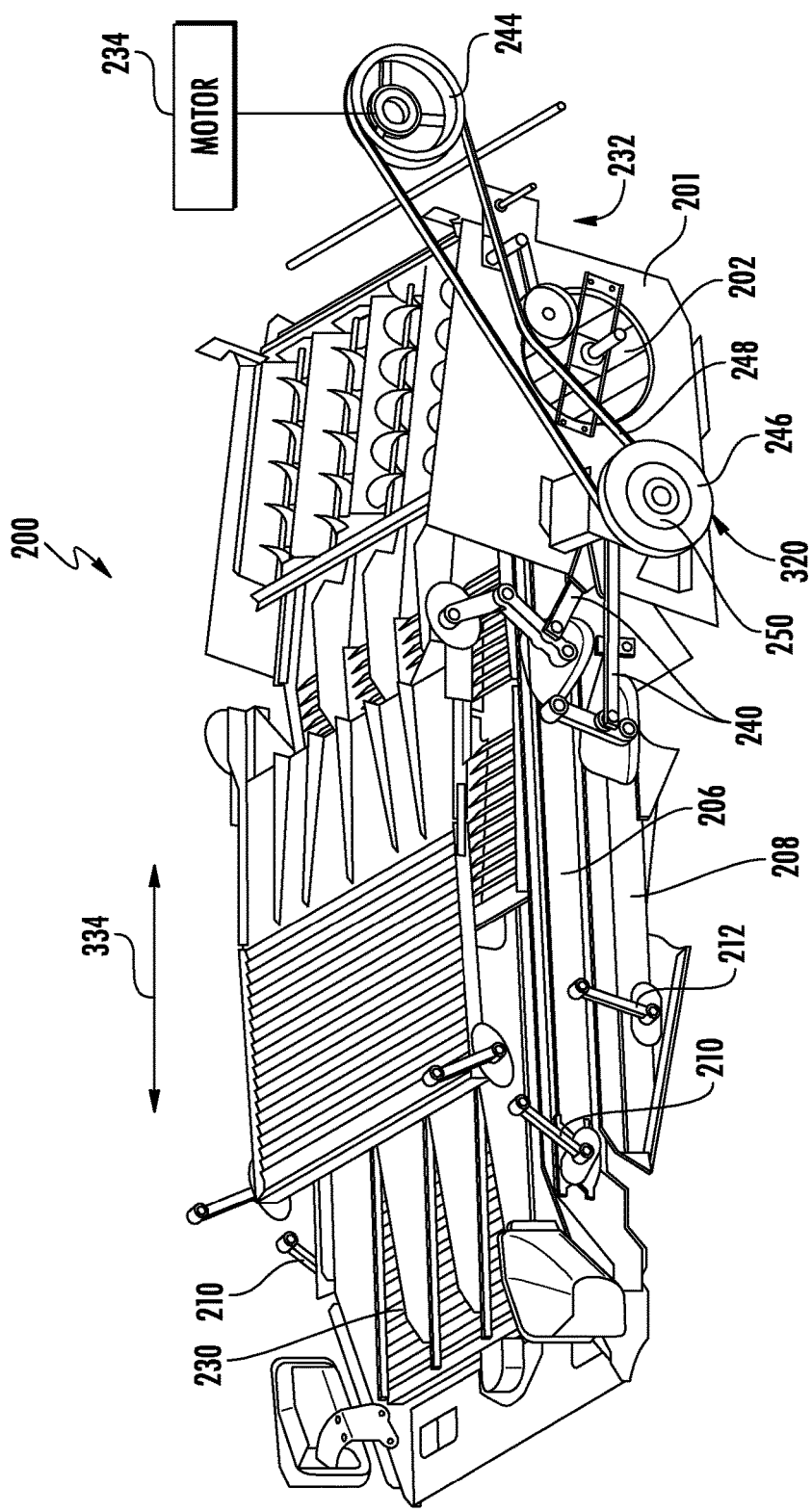
FIG. 3 is a top perspective view of an example harvester cleaning shoe comprising an example harvester reciprocating drive balancing system.

FIG. 3 is a perspective view illustrating an example crop separating portion of a harvester, shown as a harvester cleaning shoe 200, comprising an example harvester reciprocating drive balancing system 220. Harvester cleaning shoe 200 comprises housing 201, a fan 202, a housing 204, an upper sieve assembly 206, a lower sieve assembly 208, hangers 210, hangers 212 and a drive 232 comprising a motor 234, a drive crank 236, shaft 240 (shown in FIG. 4), belt drive 244, driven pulley 246, belt 248 and gear reduction mechanism 250 (schematically shown in FIG. 4).

Housing 101 comprise a structure that supports fan 202 and motor 214. Fan 202 extends laterally across substantially the entire width of the cleaning shoe. Fan 202 generates an airflow that travels rearward toward the upper sieve assembly 206 and the lower sieve assembly 208. This air is conveyed upward through the upper sieve assembly 206 and the lower sieve assembly 208, levitating mass other than grain such as straw and chaff and carries the straw and chaff rearward and out of the agricultural harvester.

The upper sieve assembly 206 comprises a frame 218 that is generally rectangular and an upper sieve 220 that is supported in the frame 218. The lower sieve assembly 208 comprises a frame 222 and a lower sieve 224 that is supported in the frame 222. Upper sieve 222 and lower sieve 224 each comprise a rectangular frame 226 and supports 228 supporting a fore-and-aft extending array of laterally extending louvers 230. Each of louvers 230 is pivotally supported by frame 126 and supports 128 to pivot about their respective longitudinal and laterally extending axes.

Each hanger 210 has an upper end and a lower end. The upper end is pivotally coupled to the chassis (not shown) of the agricultural harvester. The lower end is pivotally coupled to the upper sieve assembly 206. By this arrangement, the upper sieve assembly 206 is suspended to pivot in reciprocate generally fore and aft. The hangers 210 are disposed in a generally rectangular arrangement, to support the left front, left rear, right front, and right rear of the upper sieve assembly 106. Thus, the hangers 210 are disposed at and support the upper sieve assembly 206 at the four corners of the upper sieve assembly 206 disposed at and support the upper sieve assembly 106 at the four corners of the upper sieve assembly 206.

Each hanger 212 has an upper end and a lower end. The upper end is pivotally coupled to the chassis (not shown) of the agricultural harvester. The lower end is pivotally coupled to the lower sieve assembly 208. By this arrangement the upper sieve assembly 206 is suspended to pivot generally fore-and-aft. The hangers 212 are disposed in a generally rectangular arrangement to support the left front, left rear, right front, and right rear of the lower sieve assembly. Thus, the hangers 212 are disposed at and support the lower sieve assembly 108 at the four corners of the lower sieve assembly 208.

Sieve assemblies 206, 208 and drive 232 form an example harvester reciprocating drive balancing system 320, an example implementation of system 20 described above. Sieve assemblies 206, 208 serve as crop material separating members that are movably supported for reciprocal movement in the directions indicated by arrow 334. During such reciprocation, crop material deposited upon or above such sieve assemblies 206, 208 is separated into various components. Grain falls through the louvers 230 of sieve assemblies 206, 208 while straw or chaff is blown rearwardly by fan 202 for subsequent discharge.

Motor 234 (schematically illustrated) drives the remainder of drive 232. Motor 234 comprises a hydraulic motor driven by an engine of the harvester. Motor 234 may be operably coupled to belt drive 244 by an appropriate transmission. In the example illustrated, motor 234 rotatably drives belt drive 244 at a speed or number of revolutions per minute greater than the rate at which shaft 240 (shown in 4) is driven.

Figure 4:
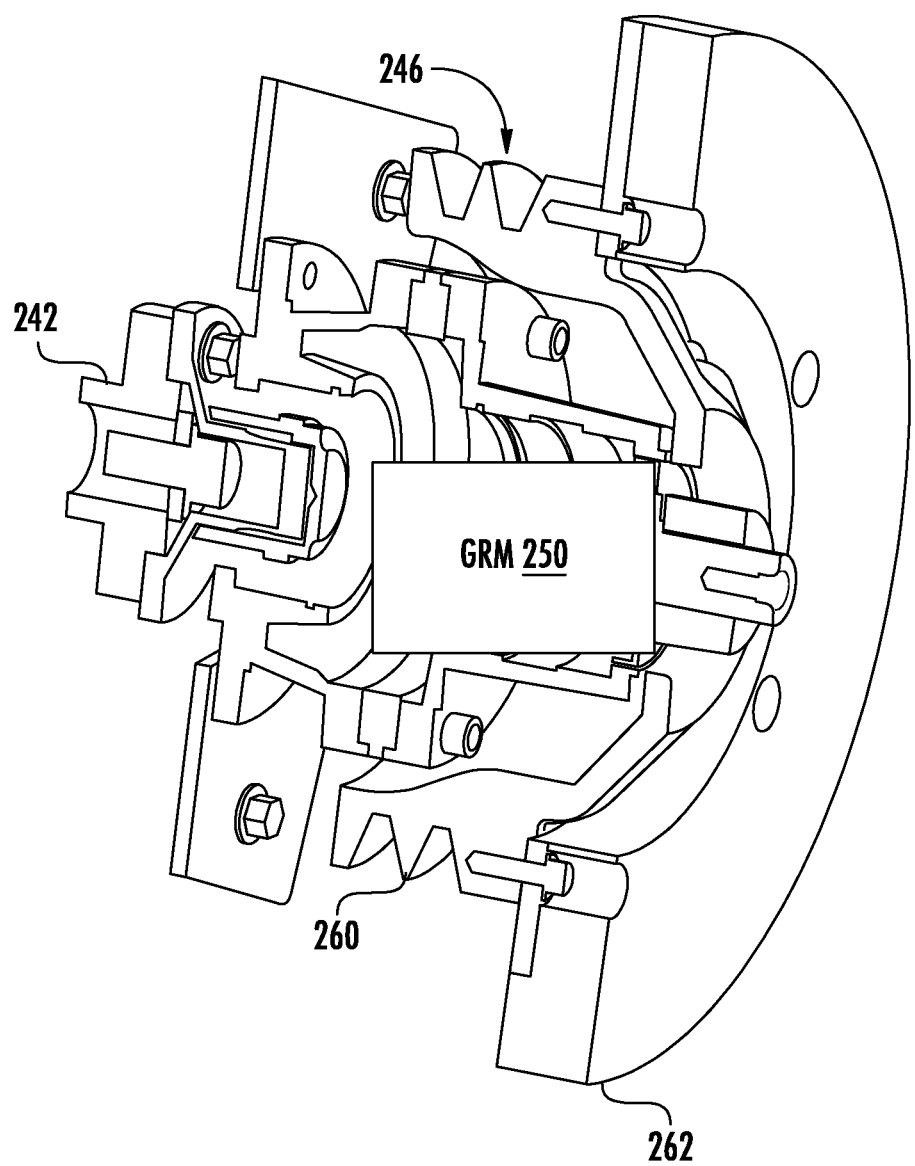
FIG. 4 is a sectional view of a portion of the example harvester reciprocating drive balancing system of the cleaning shoe of FIG. 3.

Crank 240, belt drive 244, driven pulley 246, belt 248 and gear reduction mechanism 250 are similar to crank 40, input shaft 42, belt drive 44, driven pulley 46, belt 48 and gear reduction mechanism 50 described above. FIG. 4 is a sectional view illustrating one example implementation of input shaft 42 and driven pulley 46 operably coupled to one another by gear reduction mechanism 250 (schematically shown). As shown by FIG. 4, in the example illustrated, driven pulley 246 is nested about input shaft 240. Driven pulley 246 comprises a pulley engaging portion 260 and a flywheel weight 262 fastened to pulley engaging portion 2602 increase the weight and inertia of driven pulley 246.

Driven pulley 246 is operably coupled to input shaft 242 by gear reduction mechanism 250. In one implementation, the reduction mechanism 250 has a gear reduction ratio of at least two to one. In one implementation, the reduction mechanism has a reduction ratio of at least 3 to 1. In one implementation, gear reduction mechanism 250 comprises a planetary gear box, providing compactness for its nesting within driven pulley 246 between driven pulley 246 and input shaft 42.

In one implementation, driven pulley 246, further including weight 262 has a mass of less than or equal to 12 Kg. In one implementation, the total inertia provided by driven pulley 246 and gear reduction mechanism 250 absorbs energy so as to balance or level speed and torque variations of drive 232. In one implementation, the reduction ratio of gear reduction mechanism 250, the mass of driven pulley 246 and the rate at which driven pulley 246 is rotatably driven by drive 244 is based upon empirically determined or observed speed and torque variations experienced by shaft 42 during the reciprocating of crank 240 and the one or more crop material separating members, such as sieve assemblies 206, 208. The multiplication of the inertia by gear reduction mechanism 250 facilitates and much lighter, and potentially more compact driven pulley/flywheel 246. In one implementation, increasing the speed at which driven pulley 246 is driven by drive 244 by X times (a multiplication of the rate at which input shaft 242 must be driven to reciprocate the crop material separating member or members) with a corresponding gear speed reduction ratio of S provided by gear reduction mechanism 250 may increase the overall inertia and energy absorption capability of drive 232 by $X^2$. For example, in one implementation, gear reduction mechanism 250 may have a gear reduction of three. In such an implementation, the overall inertia of driven pulley 246 is $3^2$ or 9 times that of the inertia that would otherwise result from the mere mass of driven pulley/flywheel 246 alone.

Figure 5:
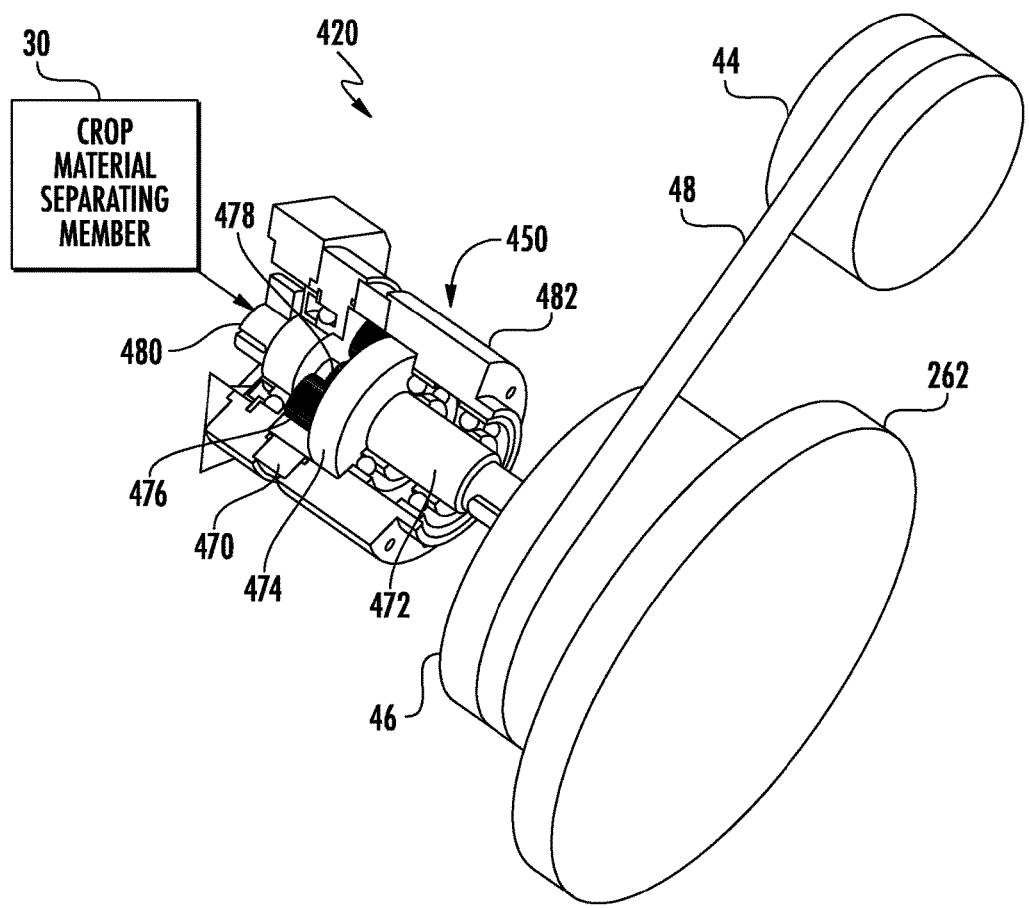
FIG. 5 is a perspective view of an example harvester reciprocating drive balancing system.

FIG. 5 is a diagram illustrating an example harvester reciprocating drive balancing system 420. System 420 is similar to system 20 except that system 420 is specifically illustrated as comprising a specific example gear reduction mechanism 450 operably coupling crop material separating member 30, via crank 40 (not shown), and driven pulley 46 specifically illustrated as including or being mounted to a flywheel weight 262. Those components of system 420 which correspond to components of system 20 described above are numbered similarly.

Gear reduction mechanism 450 comprises a planetary gear box comprising a ring gear, a son gear, a planetary gear carrier and planet gears. FIG. 5 illustrates one example planetary gear box. It should be appreciated that gear reduction mechanism 450 may comprise a planetary gear box having a variety of other planetary gear box configurations other than the illustrated example.

In the example illustrated, gear reduction mechanism 450 comprises ring gear 470, input shaft 472, planetary gear carrier 474, planetary gears 476, sun gear 478 and output shaft 480. Ring gear 470 is provided as part of a much larger housing 482 fixed are secured to structural bodies of the harvester to resist rotation. Input shaft 472 comprises a shaft extending from driven pulley 46 so as to rotate with driven pulley 46. Input shaft 472 is fixed to planetary gear carrier 474 which rotatably supports each of planetary gears 476. Sun gear 478 is fixed to output shaft 480 and is in meshing engagement with each of planetary gears 476. Output shaft 480 extends from sun gear 478 and is operably coupled to input shaft 42 (shown in FIG. 1). Rotation of driven pulley 246 rotates input shaft 472, carrier 474 and planetary gears 476 about the axis of shaft 472. Planetary gears 476 mesh with sun gear 478 to drive output shaft 480.

In one implementation, gear reduction mechanism 450 provides a 3 to 1 speed or gear reduction ratio. As a result, the speed at which driven pulley 46 and input shaft 472 are driven is reduced by a factor of 3 at output shaft 480. In other implementations, gear reduction mechanism 450 may provide other speeder gear reduction ratios. In other implementations, gear reduction mechanism 450 may have other configurations. For example, gear reduction mechanism 450, in some implementations, may be at least partially nested within driven pulley 46. System 420 may be utilized in place of system 320 in harvester cleaning shoe 200 described above, wherein sieve assemblies 206, 208 form the crop material separating member. In yet other implementations, system 420 may be utilized in other crop material separating systems of a harvester, such as with crop material separating members comprising straw walkers. In yet other implementations, system 20 may be employed in other agricultural equipment, agricultural implements or non-agricultural systems that drive one or more members (not necessarily crop material separating members) in a reciprocating manner and which experience speed and/or torque variations as a result of such reciprocation.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A harvester reciprocating drive balancing system comprising:
   a crop material separating member movably supported for reciprocal movement;
   a drive operably coupled to the crop material separating member to reciprocate the crop material separating member, the drive comprising:
   a drive crank operably coupled to the crop material separating member;
   a shaft operably coupled to the drive crank;
   a belt drive;
   a driven pulley;
   a belt wrapped about the belt drive and the driven pulley; and
   a gear reduction mechanism operably coupled between the driven pulley and the shaft.

2. The harvester reciprocating drive balancing system of claim 1, wherein the crop material separating member comprises a sieve.

3. The harvester reciprocating drive balancing system of claim 1, wherein the gear reduction mechanism comprises a planetary gear system.

4. The harvester reciprocating drive balancing system of claim 1, wherein the gear reduction mechanism comprises:
   a sun gear coupled to the shaft;
   a ring gear coupled to the driven pulley; and
   a planetary gear in meshing engagement with the ring gear and the sun gear.

5. The harvester reciprocating drive balancing system of claim 1, wherein the driven pulley serves as a flywheel, the driven pulley having a mass of less than or equal to 15 Kg.

6. The harvester reciprocating drive balancing system of claim 1, wherein the gear reduction mechanism has a reduction ratio of at least 2 to 1.

7. The harvester reciprocating drive balancing system of claim 1, wherein the gear reduction mechanism has a reduction ratio of at least 3 to 1.

8. The harvester reciprocating drive balancing system of claim 1, wherein the shaft undergoes a speed variation and a torque variation and wherein the mass of the flywheel, the velocity which the driven pulley is driven and the gear reduction ratio of the gear reduction mechanism are based upon the speed variation multiplied by the torque variation.

9. The harvester reciprocating drive balancing system of claim 1, wherein the driven pulley serves as a flywheel that rotates about a first axis and wherein the drive crank is pivotably connected to the crop material separating member and is connected to the flywheel eccentric to the first axis.

10. A harvester cleaning shoe comprising:
    a sieve movably supported for reciprocal movement;
    a drive operably coupled to the sieve to reciprocate the sieve, the drive comprising:
    a drive crank operably coupled to the crop material separating member;
    a shaft operably coupled to the drive crank;
    a belt drive;
    a driven pulley serving as a flywheel;
    a belt wrapped about the belt drive and the driven pulley; and
    a planetary gear mechanism comprising:
       a ring gear coupled to the driven pulley to rotate with the driven pulley;
       a sun gear coupled to the shaft to rotate with the shaft; and
       a planetary gear inner mashed between the ring gear and the sun gear.

11. The harvester cleaning shoe of claim 10, wherein the planetary gear has a reduction ratio of at least 3 to 1 and wherein the driven pulley, providing the flywheel, has a mass of less than or equal to 12 Kg.

12. A method comprising:
    rotatably driving a driven pulley, serving as a flywheel, at a first speed;
    transmitting torque from the driven pulley to a shaft across a gear reduction mechanism to rotate the shaft at a second speed less than the first speed; and
    transmitting torque from the shaft to a harvester crop material separating member to reciprocate the harvester crop material separating member.

13. The method of claim 12, wherein the gear reduction mechanism has a gear reduction ratio based upon a mass of the flywheel, a speed variation of the shaft and a torque variation of the shaft.

14. The method of claim 12, wherein the gear reduction mechanism comprises a planetary gear having a ring gear coupled to and rotating with the driven pulley, a sun gear coupled to and rotating with the shaft in a planetary gear in meshing engagement with and between the ring gear and the sun gear.

15. The method of claim 14, wherein the planetary gear has a reduction ratio of at least 3 to 1 and wherein the driven pulley, providing the flywheel, has a mass of less than or equal to 12 Kg.

16. The method of claim 12, wherein the flywheel has a mass of less than 15 Kg.

17. The method of claim 12 further comprising depositing crop material on the harvester crop material separating member, wherein reciprocation of the harvester crop material separating member separates the crop material into a first portion that passes through the crop material separating member and a second portion that does not pass through the crop material separating member.

18. The method of claim 12, wherein the driven pulley is rotatably driven at a speed of at least 900 revolutions per minute.

* * * * *